(12) United States Patent
Lombardo et al.

(10) Patent No.: US 7,718,102 B2
(45) Date of Patent: May 18, 2010

(54) FROTH AND METHOD OF PRODUCING FROTH

(75) Inventors: Brian Lombardo, Amherst, NH (US); Jeffrey P. Otto, Boston, MA (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

(21) Appl. No.: 10/266,552

(22) Filed: Oct. 7, 2002

(65) Prior Publication Data

US 2003/0148722 A1 Aug. 7, 2003

Related U.S. Application Data

(63) Continuation-in-part of application No. 09/317,973, filed on May 25, 1999, now Pat. No. 6,514,301.

(60) Provisional application No. 60/087,740, filed on Jun. 2, 1998.

(51) Int. Cl.
B29C 47/76 (2006.01)
(52) U.S. Cl. .............................. 264/41; 51/296; 51/298; 264/45.5; 264/45.8; 264/50; 264/69; 264/101; 366/101; 366/102; 366/131; 366/139; 366/159.1; 521/110; 521/112; 521/130; 521/133; 521/155; 521/170
(58) Field of Classification Search ................. 521/110, 521/112, 130, 133, 155, 170; 264/45.5, 45.8, 264/50, 41, 69, 101, 458; 51/296, 298; 366/101, 366/102, 131, 139, 159.1
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,868,824 A | 1/1959 | Haluska | |
| 2,917,480 A | 12/1959 | Bailey et al. | |
| 3,706,681 A * | 12/1972 | Bachura et al. | 521/111 |
| 3,755,212 A * | 8/1973 | Dunlap et al. | 521/174 |
| 3,772,224 A | 11/1973 | Marlin et al. | |
| 3,803,064 A | 4/1974 | Fishbein et al. | |
| 3,821,130 A | 6/1974 | Barron et al. | |
| 3,862,879 A * | 1/1975 | Barron et al. | 428/95 |
| 3,928,258 A | 12/1975 | Alexander | |
| 3,929,026 A | 12/1975 | Hofmann | |
| 3,940,349 A | 2/1976 | Corbett | |
| 3,943,075 A | 3/1976 | Fishbein et al. | |
| 3,947,386 A | 3/1976 | Prokai et al. | |
| 3,957,842 A | 5/1976 | Prokai et al. | |
| 4,022,722 A | 5/1977 | Prokai et al. | |
| 4,022,941 A | 5/1977 | Prokai et al. | |
| 4,038,238 A | 7/1977 | Cravens | |
| 4,138,228 A | 2/1979 | Hartfelt et al. | |
| 4,216,177 A | 8/1980 | Otto | |
| 4,275,172 A | 6/1981 | Barth et al. | |
| 4,374,209 A | 2/1983 | Rowlands | |
| 4,412,962 A | 11/1983 | Bessette et al. | |
| 4,546,118 A | 10/1985 | Simpson et al. | |
| 4,576,612 A | 3/1986 | Shukla et al. | |
| 4,613,345 A | 9/1986 | Thicke et al. | |
| 4,649,074 A | 3/1987 | Borel | |
| 4,728,552 A | 3/1988 | Jensen, Jr. | |
| 4,753,838 A | 6/1988 | Kimura et al. | |
| 4,767,793 A | 8/1988 | Schisler et al. | |
| 4,771,078 A | 9/1988 | Schisler et al. | |
| 4,796,749 A | 1/1989 | Lefferts | |
| 4,814,409 A | 3/1989 | Blevins, II et al. | |
| 4,828,542 A | 5/1989 | Hermann | |
| 4,841,680 A | 6/1989 | Hoffstein et al. | |
| 4,857,368 A | 8/1989 | Klein | |
| 4,882,363 A | 11/1989 | Neuhaus et al. | |
| 4,927,432 A | 5/1990 | Budinger et al. | |
| 4,954,141 A | 9/1990 | Takiyama et al. | |
| 4,962,562 A | 10/1990 | Englund et al. | |
| 5,020,283 A | 6/1991 | Tuttle | |

(Continued)

FOREIGN PATENT DOCUMENTS

EP 829328 3/1988

(Continued)

OTHER PUBLICATIONS

E.T. Oakes Corporation product listing, www.oakes.com Nov. 2004.*

(Continued)

Primary Examiner—John Cooney
(74) Attorney, Agent, or Firm—Iurie A. Schwartz

(57) ABSTRACT

Foam for making pads and belts with controlled, reproducible microcellular structure and method of making such foam in a fast and efficient manner. Under constant pressure and temperature, a prepolymer is mixed with the nucleation surfactant in a tank in the presence of a frothing agent metered into the tank by way of a dip tube or sparge. The nitrogen gas is sheared into small bubbles and is drawn off from the headspace of the tank creating a continuous flow of nitrogen. The pressure of the tank may vary from any absolute pressure down to near complete vacuum, thereby all but eliminating the pressure requirement. The froth of the present invention has a more consistent cell structure and increased cell count.

17 Claims, 3 Drawing Sheets

U.S. PATENT DOCUMENTS

| | | |
|---|---|---|
| 5,098,621 A | 3/1992 | Hermann .................... 264/46.4 |
| 5,145,879 A | 9/1992 | Budnik et al. .............. 521/112 |
| 5,177,908 A | 1/1993 | Tuttle .......................... 51/283 |
| 5,197,999 A | 3/1993 | Thomas ....................... 51/298 |
| 5,212,910 A | 5/1993 | Breivogel et al. ............. 51/398 |
| 5,234,867 A | 8/1993 | Schultz et al. .............. 437/225 |
| 5,257,478 A | 11/1993 | Hyde et al. ................ 51/131.3 |
| 5,287,663 A | 2/1994 | Pierce et al. .................. 51/401 |
| 5,329,734 A | 7/1994 | Yu ............................... 51/283 |
| 5,334,622 A | 8/1994 | Bergvist ...................... 521/74 |
| 5,401,785 A | 3/1995 | Kumagai et al. ............ 521/112 |
| 5,487,697 A | 1/1996 | Jensen ........................ 451/324 |
| 5,489,233 A | 2/1996 | Cook et al. ................... 451/41 |
| 5,491,174 A | 2/1996 | Grier et al. ................. 521/128 |
| 5,514,456 A | 5/1996 | Lefferts ...................... 428/222 |
| 5,525,640 A | 6/1996 | Gerkin et al. ............... 521/112 |
| 5,534,106 A | 7/1996 | Cote et al. ............... 156/636.1 |
| 5,565,149 A | 10/1996 | Page et al. ............... 261/140.1 |
| 5,578,362 A | 11/1996 | Reinhardt et al. ........... 428/147 |
| 5,602,190 A | 2/1997 | Lamberts et al. ............ 521/131 |
| 5,604,267 A | 2/1997 | Duffy ......................... 521/133 |
| 5,605,760 A | 2/1997 | Roberts ...................... 428/409 |
| 5,622,662 A | 4/1997 | Veiga et al. ................ 264/45.3 |
| 5,692,947 A | 12/1997 | Talieh et al. .................. 451/41 |
| 5,735,731 A | 4/1998 | Lee ............................ 451/143 |
| 5,789,454 A | 8/1998 | McVey ....................... 521/112 |
| 5,807,903 A | 9/1998 | Stanga et al. ............... 521/112 |
| 5,844,010 A | 12/1998 | Burkhart et al. ............. 521/112 |
| 5,859,081 A | 1/1999 | Duffy ......................... 521/133 |
| 5,883,142 A | 3/1999 | Chojnacki et al. ........... 521/112 |
| 5,900,164 A | 5/1999 | Budinger et al. .............. 216/88 |
| 6,019,919 A | 2/2000 | Sulzbach et al. .............. 264/50 |
| 6,071,978 A | 6/2000 | Eisen et al. ................. 521/131 |
| 6,169,122 B1 | 1/2001 | Blizard et al. ................. 521/79 |

FOREIGN PATENT DOCUMENTS

| | | |
|---|---|---|
| EP | 696495 | 2/1996 |
| EP | 645226 | 5/1997 |
| EP | 1029888 | 8/2000 |
| GB | 2244714 | 12/1991 |
| WO | 9616436 | 5/1996 |
| WO | 9835786 | 8/1998 |

OTHER PUBLICATIONS

Fynn, G. et al., The Cutting and Polishing of Electro-Optic Materials, Halsted Press, 1979, Section 3.2.6, pp. 82-83.

* cited by examiner

FROTH AND METHOD OF PRODUCING FROTH

CROSS REFERENCE TO RELATED APPLICATION

This application is a continuation-in-part of a U.S. patent application Ser. No. 09/317,973, entitled "Foam Semiconductor Polishing Belts and Pads," filed May 25, 1999, which is now U.S. Pat. No. 6,514,301, which is a nonprovisional application claiming priority to U.S. Provisional Application No. 60/087,740, filed Jun. 2, 1998.

BACKGROUND OF THE INVENTION

1. Field of the Invention

The present invention relates to an improved foam and method of producing such foam for a variety of applications, including semiconductor polishing pads and belts.

2. Description of the Related Art

Silicon wafers are produced as precursors from which microelectronic semiconductor components are produced. The wafers are sliced or cut from cylindrical silicon crystals, parallel to their major surfaces, to produce thin disks, typically 20-30 centimeters in diameter, although larger or smaller wafers are possible. The resulting wafers must be polished to give flat and planar surfaces for proper formation of electronic components to form integrated chip semiconductor devices. Typically, a 20-cm diameter wafer will produce 100 or more microprocessor chips.

The design size of such integrated chips is steadily decreasing, while the number of layers applied, e.g., by various sequences of depositing, patterning, and etching of features onto the silicon surface, is rising. Present semiconductors typically incorporate up to 8 or more metal layers, and it is expected that future designs will contain even more layers. The decrease in the size of the circuitry and the increase in the number of layers applied are leading to even more stringent requirements on the smoothness and planarity of the silicon and semiconductor wafers throughout the chip manufacturing process, since uneven surfaces may undermine the patterning process and the general integrity of the resulting circuit.

In the semiconductor chip fabrication process, it is well-known that there is a need to polish a semiconductor wafer. This polishing is typically-accomplished by a chemical mechanical process (CMP). One standard CMP wafer polishing technique is to position a wafer over a rotating polishing pad that is usually disk-shaped, and is mounted on a large turntable. A chemical-mechanical polishing slurry is usually applied to the surface of the pad, and the wafer is held in place by an overhead wafer carrier while being polished by the rotating pad and slurry. The slurry is generally made up of an aqueous solution with metallic or non-metallic particles such as, for example, aluminum or silica abrasives that create the added friction for the polishing process.

A significantly different approach is the so-called Linear Planarization Technology (LPT), wherein the polishing pad is mounted onto a supporting belt and is used to polish the wafer, in place of the flat turntable form of the polishing tool. The belt used in this method is described in EP-A-0696495 and comprises an endless sheet of steel or other high strength material, having a conventional flat polyurethane polishing pad affixed to it with adhesive. As with the rotating pad, the pad used for LPT CMP polishing receives a chemical-mechanical polishing slurry that is distributed over the surface of the belt.

State of the art semiconductor polishing pads are made from high density polyurethane foams that have a functional porous structure, which aids the distribution of the chemical-mechanical polishing slurry and reduces hydroplaning, for example. Such pads are formed from a polymeric composition that comprise a dispersion of thin-walled, hollow plastic beads or "microspheres," which can potentially provide a controlled and consistent microcellular structure.

However, there are some limitations to the use of hollow microspheres in polishing pads. The size and shape of the foam's cells are restricted to the limited sizes and shapes of the commercially available microspheres. In addition, microspheres may be too abrasive for some delicate polishing operations, e.g. certain steps in semiconductor manufacturing including, but not limited to, chemical mechanical polishing of soft metal layers. Typically, the microspheres are extremely light weight and flammable, posing significant material handling difficulties, including dust explosion hazards. The lightweight microspheres are also difficult to disperse in the polyurethane resins. They tend to clump and foul process equipment, and often entrain significant amounts of air, which leads to problematic variations in porosity of the cured foam. Also, the microspheres can distort, collapse, or melt if processed at high temperatures that are routinely used in processing polyurethanes and other potential pad materials.

Foam density, a measurement of the mass of froth per unit volume, is one of the most important properties of froth, directly affecting the durability and support of the foam. It is commonly measured and expressed in pounds per cubic foot (pcf) or kilograms per cubic meter ($kg/m^3$), but may also be stated as g/cc. Foam density is directly related to the specific gravity of the foam.

Although there are several conventional ways to create high density polyurethane foam, including mechanical frothing and chemical blowing processes, pads produced by the conventional methods have not been successful in semiconductor polishing. While the polishing pads produced by the conventional method may be suitable for polishing glass and other low technology applications, they have not been as successful in semiconductor polishing, which is a more precise and more delicate application, because of the variability in pad cell structure and pad properties. Often times, the density of the foam produced by these conventional frothing methods varies greatly due to the conventional methods' inability to consistently produce foam within a preferable range of specific gravities or because of impurities, e.g. oxygen, contained within the foam. Another significant drawback of the prior art frothing methods is the time involved in producing the froth. Consequently, there is a need for a time efficient method of manufacturing froth falling within an optimal specific gravity range.

OBJECTS OF THE INVENTION

A method of producing froth used to produce a microcellular polishing pad or belt in a more expedient and efficient manner than the conventional prior art methods.

A method of producing froth used to produce a microcellular polishing pad or belt in which the froth produced has greater cell density than the froth produced using the conventional prior art methods.

A method of producing froth used to produce a microcellular polishing pad or belt which allows for better control, i.e., tighter range, over the specific gravity of the resulting froth.

A method of producing froth used to produce a microcellular polishing pad or belt which minimizes the volatile components and oxygen contamination in the froth.

A method of producing froth used to produce a microcellular polishing pad or belt wherein the froth density and average cell size can be varied independently of each other.

Another object of the invention is to provide a froth with a greater cell density and more uniform cell structure than the prior art froth.

Another object of the invention is to provide a froth having a preferred specific gravity.

Another object of the invention is to provide a froth that is essentially free of volatile components and contaminants.

Other aspects and advantages of the invention will become apparent from the following detailed description, taken in conjunction with the accompanying drawings, illustrating by way of example the principle of the invention.

SUMMARY OF THE INVENTION

This invention comprises high density foam semiconductor polishing pads and belts with controlled, reproducible microcellular structures that have been produced by a novel method of mechanical frothing. This invention provides an improved method for producing semiconductor polishing pads with consistent cell structure and properties, that perform equal to or better than the state-of-the-art polishing pads. The method also provides increased degrees of freedom and convenience in producing pads with different desired cell structures.

This invention also comprises a novel method of mechanically frothing the prepolymer material used for making foam semiconductor polishing pads and belts with controlled, reproducible microcellular structure. This invention provides a fast and efficient method for producing froth while also providing improved control over the specific gravity of the resulting froth. By providing more control over the specific gravity of the froth as well as minimizing the volatile components and contaminants that are contained within the froth, the present invention provides a pad or belt with a more consistent cell structure and greater cell density than the state-of-the-art pads. Due to the increase in cell density and a more consistent cell structure, the pads and belts of the present invention allow for increased polishing rates and more even planarization of the workpiece. In addition, the present invention also provides increased degrees of freedom and convenience with respect to the pressure under which the resulting froth and pads are produced.

It should be noted at this point that the term "pad," as used herein, refers to polishing disks, polishing belts and any other geometric shape that may serve to polish semiconductor wafers. As a result, the term "pad" may be used interchangeably with the term "belt." Moreover, the term "polishing disk" refers generally to any polishing pad that is used on a rotating, moving or stationary platen, regardless of the pad's shape. In other words, even though most polishing pads used on rotating platens are in fact disk-shaped, the term "polishing disk," as used herein, is not confined to that shape.

BRIEF DESCRIPTION OF THE DRAWINGS

For a more complete understanding of the objects of the present invention, the Detailed Description of the Invention will be taken with the drawings, wherein.

DETAILED DESCRIPTION OF THE PREFERRED EMBODIMENT

Figure 1:
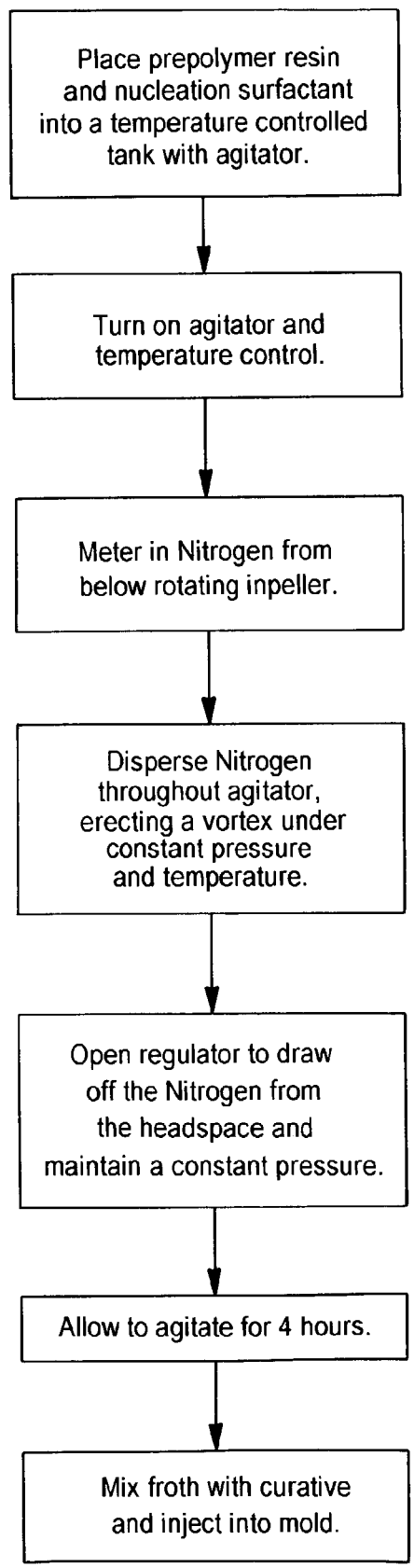
FIG. 1 is block diagram showing the production flow of the method of the present invention.

This invention comprises a method for making high density foam semiconductor polishing pads and belts with controlled, reproducible microcellular structure by mechanical frothing. This invention also comprises foam and pads with increased cell density and uniform distribution of cells having a preferred specific gravity. Preferably, the specific gravity of the foam is within the range of 0.7-1.0 g/cc. More preferably, the specific gravity of the foam is within the range of 0.80-0.95 g/cc. The preferable range of specific gravity of the pad is 05-1.2 g/cc. Preferably, the specific gravity for the pad is 0.7-1.0 g/cc. Even more preferable, the specific gravity for the pad made from the foam of the present invention is 0.85-0.95 g/cc.

The method of the present invention involves agitating a liquid polymer resin at a controlled temperature and pressure in order to produce a stable froth. Next, the resin froth is metered into a mix head where it is typically combined with the desired amount of curative before being injected or poured into a mold.

The resin material is typically polyurethane but can be any suitable thermoset polymeric material. In the case of urethanes, any suitable formulation is acceptable, including the incorporation or utilization of various fillers, catalysts, additives, and surfactants. Catalysts and blowing agents can be used to create an open-celled structure in the polishing pad or to enlarge the cells after the mixture is poured into the mold. It has been found that nucleation surfactants, that are commonly used in the manufacture of low density blow foams, are useful for producing a stable froth, which is critical to the present invention. One particularly useful nucleating surfactant is a block polymer containing at least one block comprising polydimethylsiloxane and at least one other block comprising polyether, polyester, polyamide, or polycarbonate segments. Other surfactants may include a surfactant having a block copolymer with one block containing silicon atoms and another block containing polyether, polyester, polyamide, polycarbonate, polyurethane or polyurea links, or any other surfactant that stabilizes the small bubbles of gas in the froth that is being produced. The stable froth produced with the aid of the nucleation surfactants forms easily with simple agitation schemes and maintains its integrity when put through processing equipment with varying temperature, pressures, and shear conditions.

Any suitable gas can be used as the frothing agent. Typically, dry nitrogen or dry air are used in the frothing vessel, although carbon dioxide, argon or an inert gas (e.g., hydrocarbons, HFCs, HCFCs etc) may also be used.

Different cell sizes and different overall densities or porosities can be achieved by selecting the process temperatures, pressures and agitation schemes. Different pressures can be used at different points or times in the process. For example, frothing dispensing, and molding pressures can all be different. Preferably the stable froth is produced at a temperature of ambient to 100° C. and at a pressure of ambient to 100 psig. Preferably the stable froth is metered to the mix head under a pressure of ambient to 200 psig.

Various molds or tooling designs may be employed to aid in maintaining or controlling the overall foam density and cell structure of the molded part.

Any suitable mixing, foaming, or dispensing equipment is acceptable, including those utilizing recirculation schemes.

An alternate variation of the present invention involves preparing the stable froth in continuous or semi-continuous fashion, in-line between a resin holding tank and the dispensing mix head.

Referring to FIG. 1, a high density foam semiconductor polishing pad or belt with controlled, reproducible microcellular structure is made by placing a polymerizable material and a nucleation surfactant in an tank. Although FIG. 1 depicts a single tank, the present invention may be practiced using two or more tanks or vessels. The polymerizable material typically used is polyurethane prepolymer. However, any thermosetable polymer or prepolymer material could be used including, but not limited to, a polyamide, a polyester, a polyacrylonitrile, a polyacrylate, a polymethacrylate, a polyvinylchloride, a polyvinyledene fluoride, a polytetrafluoroethylene, a polyethylene, a polypropylene and a polycarbonate. In addition, it is conceivable that all polymerizable materials including thermoplastics, epoxies, silicone resins and rubbers could be used in this process.

As mentioned above, nucleation surfactants are useful for producing a stable froth, which is critical to the present invention. For example a block copolymer containing at least one block comprising polydimethylsiloxane or siloxane polyalkyleneoxide and at least one other block comprising polyether, polyester, polyamide, or polycarbonate segments may be used to stabilize the small bubbles of gas that are produced by the combination of the prepolymer and frothing agent.

Figure 2:
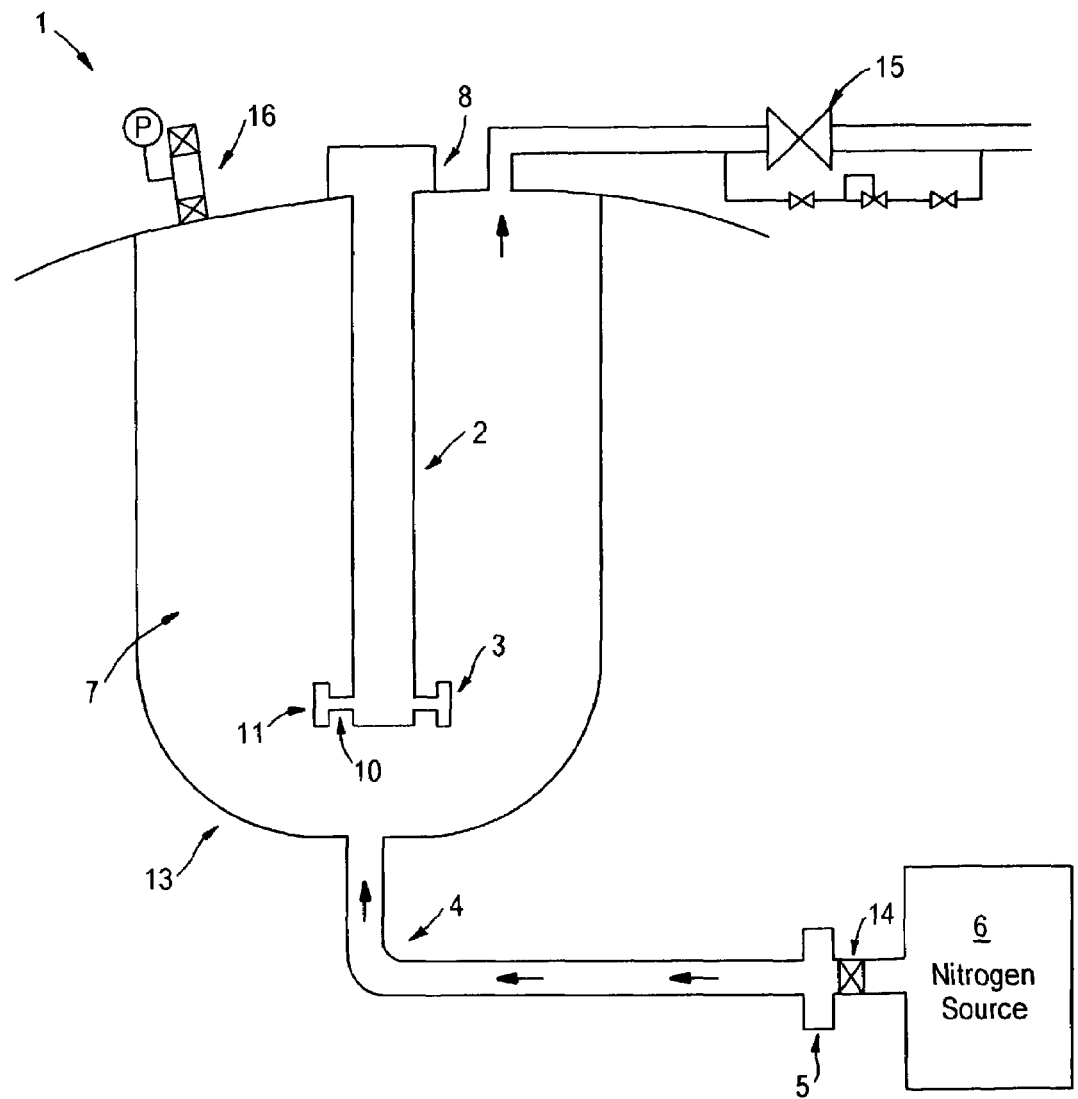
FIG. 2 is a perspective view of a tank with agitator used in performing the methods of the claimed invention.

The tank 1, which is described in greater detail below in reference to FIG. 2, is typically a cylindrically-shaped vessel with at least one shaft 2, extending from the upper portion of the tank, to which one or more impellers 3 are attached. The prepolymer is mixed with the nucleation surfactant by the rotation of the impeller 3 in the presence of a frothing agent which is metered into the tank by way of a dip tube or sparge 4 located below the impeller, although alternative embodiments may place the sparge at various locations within the tank. In the preferred embodiment, nitrogen is the preferred frothing agent, although it is understood that those skilled in the art may choose to use other frothing agents which produce a froth consistent with the present invention. The nitrogen gas, metered in from below the impeller, flows upward, where it is sheared into small bubbles. At steady state, an equal amount of nitrogen breaks the surface and is drawn off from the headspace of the tank. This continuous flow of nitrogen through the tank removes volatile components and other gas impurities that are often present in the froth produced by conventional frothing methods. These contaminants have an adverse impact on the consistency and planarization performance of the belts produced from such froth. Consequently, by removing these contaminants, the present invention results in polishing pads with improved ability to planarize and a more uniform cell structure which are necessary characteristics of semiconductor polishing pads.

Whereas previous frothing methods only produced froths at pressures greater than atmospheric, the present invention produces froth at any absolute pressure down to near complete vacuum. The manufacture of froth under either vacuum or pressure allows for a larger range of specific gravities of the resulting froth, as shown in Example 1 below.

Hence, the froth produced under vacuum will have a preferred density which results in a more uniform cell structure and higher cell density than conventional frothing methods. It also provides greater control and flexibility over conventional frothing by allowing the overall density of the froth to be varied independently from the average cell size. This ability to vary the density of the froth independently of the average cell size provides manufacturers a great deal of flexibility to produce froth specifically suited to the individual requirements of certain types of industries and applications, all at a lower cost. For example, although specific reference is made to the semiconductor industry in the above embodiment, the froth of the present invention may be used in other industries such as the pharmaceutical, chemical, and food industries.

Referring back to FIG. 1, after the agitation of the froth is complete the impeller is turned off and the inflow of nitrogen is stopped. The pressure in the tank is increased to a predetermined value and the froth is then metered under pressure, using close tolerance gear pumps, to a mix head, where it may be combined with any number of curatives. The stable froth is metered to the mix head under a pressure of ambient to 200 psi. Preferably, the stable froth is metered into the mixhead at a pressure of 50 psi.

Prior to entering the mixhead, the curative (e.g., Ethacure 300 from Albemarle) is heated and degassed in a separate process tank. The curative tank is normally held under vacuum between pours, but will be pressurized prior to dispensing. The pressure in the tank, along with the close tolerance gear pumps, accurately meters the curative from the curative tank to the mixhead. Care is taken to keep all the materials protected from contact or exposure to moisture. This is accomplished by using closed tanks and containers and by blanketing with dry nitrogen gas instead of ambient room air.

Once the froth and curative are metered into the mixhead, various additional components such as fillers, catalysts, additives, blowing agents and surfactants may be incorporated. Catalysts and blowing agents can be used to create an open-celled structure in the polishing pad or to enlarge the cells after the mixture is poured into the molds. The froth, curative and various additives are then thoroughly mixed before proceeding through a manifold, where this material is injected into a mold cavity, typically at the bottom of the mold. The molds are usually open on top, so that the material overflows the mold at the end of the pour.

The material will set-up into a solid in the hot mold in about 5 minutes. The casting is removed from the mold and sometimes placed on a retaining ring (to maintain its form) in an oven and fully cured for a prescribed time (typically 16-24 hours for urethanes) prior to being sent through to secondary machining steps such as turning, grinding, grooving, endpoint detection punching, and other trimming and laminating steps.

Different cell sizes and different overall cell densities or porosities can be achieved by selecting the process temperatures, pressures, and agitation schemes. Different pressures can be used at different points or times in the process. Frothing, dispensing, and molding pressures can all be different. For example, the froth may be produced at pressures ranging from an 18" Hg vacuum to 10 psig. Preferably, the froth is produced at a vacuum pressure of 4" Hg to 16" Hg. More preferably, the froth is produced at a vacuum pressure of 6" Hg to 12" Hg. Even more preferably, the froth is produced at a vacuum pressure of 8" Hg. Any temperature that result in a froth viscosity of 500-1500 centipoises may be used. Preferably, the froth is produced at a temperature that results in a viscosity of about 1,000 centipoises. More preferably, the stable froth is produced at a temperature of 150° F.

FIG. 2 depicts a cylindrically shaped tank 1 with a curved base to assist in the mixing of the tank contents. Tank 1, containing prepolymer resin and a nucleation surfactant 7, receives nitrogen from a nitrogen source 6 through dip tube 4. A flowmeter 5 measures the rate of nitrogen flow and control valve 14 may be used to automatically or manually adjust the flow rate of the nitrogen entering the tank 1, which is usually set between 1-10 standard cubic feet per hour (scfh) depending on the size of the tank. Preferably, the flow rate is 5 scfh. One type of flowmeter commonly used to measure the rate of flow of the incoming nitrogen is a rotometer. The rotometer comprises a vertical tapered tube that houses a movable float that moves up and down in the tube in proportion to the rate of flow. Rotometer 5 has a direct-reading scale that is calibrated to read scfh units.

As nitrogen gas enters from dip tube 4 located below the impeller 3 at the lower portion 13 of the tank 1, an electric motor 8 rotates the shaft 2 and the impeller 3. The motor 8 can be set to rotate the shaft 2 and impeller 3 at any speed. Preferably, the impeller rotates at a speed of 400-1100 rpms. More preferably, the impeller rotates at a speed of 803 rpms. The impeller of the preferred embodiment consists of a horizontal disk 10 with vertical blades 11 attached to the perimeter of the disc.

Figure 3:
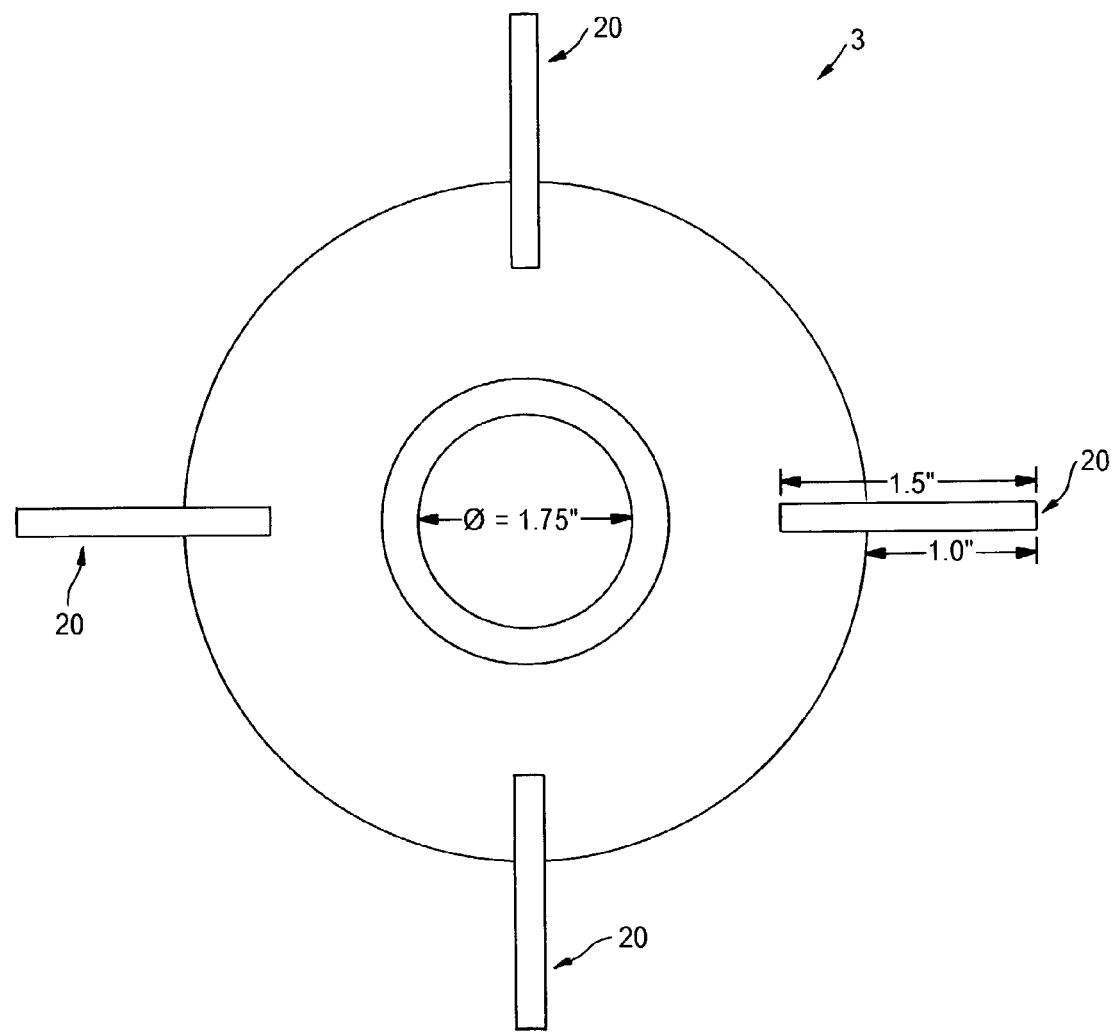
FIG. 3 is an axial view of a 4-blade impeller used in performing the methods of the claimed invention.

The use of high sheer impellers for gas dispersion applications is well known in the art. These impellers are typically constructed of metal or plastic. FIG. 3 depicts one common impeller design often referred to as a Rushton impeller, although any other impeller that creates trailing vortices that perform the function of shearing bubbles may be used. Rushton impellers are radial flow, disk turbines, the diameter of which is typically ⅓ of the tank diameter, and which usually have 4-6 vertical flat blades fixedly attached around the periphery of the disc. The Rushton impeller is designed to provide high shear conditions required for breaking the bubbles of the polymer resin and is often chosen for its ability to deliver high turbulence power numbers. The impeller depicted in FIG. 3 is of the 4-blade design type 20 and has an overall diameter of 6 inches. Although FIG. 3 shows a 6", 4-blade Rushton design, it is appreciated by those skilled in the art that other suitable impellers having different shapes and sizes, different blade curvatures, different diameters, varying shaft sizes and different number of blades may be used to practice the claimed method depending on variables such as the gas flow rate and power output of the electrical motor.

Referring back to FIG. 2, as shaft 2 turns, the fluid 7 inside the tank hits the broad face of the blade and creates a vortex behind it (not shown). This trailing vortex contributes to the creation of the froth by cleaving large bubbles into smaller ones. It is the use of the impeller 3 in conjunction with the continuous nitrogen flow coming from below the impeller that contributes to the froth being produced in a shorter period of time and in a more repeatable and efficient manner than traditional frothing methods.

As illustrated in FIG. 2, the nitrogen is metered into the tank from below the impeller and travels upward towards the headspace of the tank where it is drawn out of the tank through pressure regulator 16, which is responsible for accurately controlling the pressure of the tank in conjunction with vacuum pump 15. The nitrogen metered into the tank 1 from the lower portion 13, in combination with pressure regulator 16 drawing off the nitrogen from the headspace above, allows the tank to reach a steady state of nitrogen flow. This allows a froth to be formed without having to create a vortex that draws gas down to the impeller from the headspace of the tank. As a result of this efficiency, the frothing method of the this embodiment is essentially independent of the tank level and results in a more consistent froth, which is a significant improvement over conventional frothing methods. The present method also allows for very accurate pressure control and is able to compensate for small gas leaks that caused conventional closed tanks to lose pressure.

Also, as discussed above, manufacturing froth at pressures of slight vacuum to near complete vacuum facilitates improved control over the specific gravity of the resulting froth, which improves the overall density of the polishing pad or belt made from such froth and permits the polishing pad or belt to maintain its integrity when it is put through processing equipment with varying temperatures and stresses.

The following non-limitative examples illustrate the invention:

Example 1

To demonstrate the superior control over the specific gravity of the froth of the present invention, froth was prepared at varying vacuum pressures; the temperature and nitrogen inflow remained constant. The specific gravity of the froth was measured at vacuum pressures of 18" Hg, 12" Hg, 9" Hg, 8" Hg, 4" Hg, and 0" Hg.

63.3 kg of Adiprene® LF 750D (available from Crompton Corporation, Middlebury, Conn.), a polyurethane resin, was added to a controlled process tank at a temperature of 150° F. 316 g of polydimethylsiloxane surfactant (UAX-1600, available from Witco Corporation) was incorporated into the Adiprene® resin. The tank agitator was set to a rotational speed of 803 rpm using a 6" 4-blade impeller. Nitrogen gas was metered in at a rate of 5 scfh through a sparge located at the bottom of the tank. A pressure regulator was used to control the pressure of the tank.

After 2.5 hours of constant agitation at 18" Hg, the impeller was temporarily turned off, the influx of nitrogen gas was momentarily stopped and tank was brought to atmospheric pressure. A first sample of the froth, obtained from the bottom of the tank, was measured to have a specific gravity of 0.96.

The agitator was once again set to a rotational speed of 803 rpm and the nitrogen gas was metered in at a rate of 5 scfh. The vacuum pressure was adjusted to 12" Hg. All other variables such as temperature and nitrogen flow remained constant. After one hour of agitation at 12" Hg, the agitator and nitrogen flow were turned off and the tank was brought to atmospheric pressure. A second sample of the froth, obtained from the bottom of the tank, was measured to have a specific gravity of 0.92.

The agitator was set to a rotational speed of 803 rpm and the nitrogen gas was metered in at a rate of 5 scfh. The vacuum pressure was adjusted to 9" Hg. All other variables such as temperature and nitrogen flow remained constant. After one hour of agitation at 9" Hg, the agitator and nitrogen flow were turned off and the tank was brought to atmospheric pressure. A third sample of the froth, obtained from the bottom of the tank, was measured to have a specific gravity of 0.87.

The agitator was once again set to a rotational speed of 803 rpm and the nitrogen gas was metered in at a rate of 5 scfh. The vacuum pressure was adjusted to 8" Hg. All other variables such as temperature and nitrogen flow remained constant. After one hour of agitation at 8" Hg, the agitator and nitrogen flow were turned off and the tank was brought to atmospheric pressure. A fourth sample of the froth, obtained from the bottom of the tank, was measured to have a specific gravity of 0.86.

The agitator was once again turned on and set to a rotational speed of 803 rpm and the nitrogen gas was metered in at a rate of 5 scfh. The vacuum pressure was adjusted to 4" Hg. All other variables such as temperature and nitrogen flow remained constant. After one hour of agitation at 4" Hg, the agitator and nitrogen flow were turned off and the tank was brought to atmospheric pressure. A fifth sample of the froth, obtained from the bottom of the tank, was measured to have a specific gravity of 0.84.

The agitator was again set to a rotational speed of 803 rpm and the nitrogen gas was metered in at a rate of 5 scfh. The pressure was adjusted to 0" Hg, which is atmospheric pressure in this example. All other variables such as temperature and nitrogen flow remained constant. After one hour of agitation at 0" Hg, the agitator and nitrogen flow were turned off. A sixth sample of the froth, obtained from the bottom of the tank, was measured to have a specific gravity of 0.79.

Graph 1 is diagrammatic illustration of the data obtained from Example 1 above. The y-axis represents the specific gravity of the froth in g/cc, and the x-axis is a measure of the vacuum pressure in " Hg, wherein 30" Hg represents complete vacuum and 0" Hg represents atmospheric pressure. Referring to the plotted data of Example 1, it is clear that the production of froth under vacuum results in a froth within a range of 0.96 to above 0.79. More preferably, Graph 1 illustrates that a froth prepared at a vacuum of 16" Hg to 4" Hg resulted in a froth having specific gravities within the range of 0.8-0.9 g/cc, which represents a preferred range of specific gravities for semiconductor polishing belts and pads. It is only when the pressure of the tank approached atmospheric pressure and beyond, that the specific gravity of the froth fell out of the preferred range. Consequently, the results of Example 1 and the accompanying graph clearly demonstrate that the froth of the present invention may be produced within a tight range of specific gravity, in a time-efficient manner.

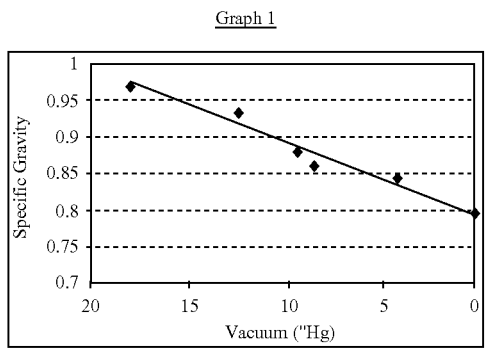

Graph 1

Example 2

With a 5" diameter, 4-blade impeller installed, add 60 kg of Adiprene® LF 750D to a temperature controlled process tank. Add 300 g of UAX-1600 surfactant. Turn the tank temperature controller on with a setpoint of 150° F. Turn on the tank agitator to a speed of 1011 rpm. Turn on the nitrogen sparge to the bottom of the tank with a flow rate of 2 scfh. Vent the headspace of the tank to control at atmospheric pressure. Allow to agitate for at least 4 hours. The resulting froth will have approximately a 0.74 specific gravity.

Example 3

Batch Preparation: Add 40,000 g of Adiprene® LF 750D from Uniroyal Chemical Company, urethane prepolymer, to a process tank equipped with heating and variable speed agitation. Add 2,000 g of UAX-6123, a nucleating surfactant form Witco Corporation. Pressurize tank with nitrogen at 7 psig, agitate with simple impeller to create moderate vortex, and heat to 150° F.

Dispensing: Stop agitation or resin mixture, and pressurize Ethacure® 300, diamine curative from Albemarle Corporation, with nitrogen to 50 psig. Dispense and thoroughly mix resin mixture and curative simultaneously in a ratio of 102 parts to 21.5 parts by weight. Adjust backpressure in mixhead to avoid cavitation and to allow smooth dispensing and expansion of the foam. The resultant microcellular foam has approximately 0.68 specific gravity.

Example 4

Batch Preparation: Add 40,000 g of Adiprene® LF 750D from Uniroyal Chemical Company, urethane prepolymer, to a process tank equipped with heating and variable speed agitation. Add 200 g of UAX-6123, a nucleating surfactant form Witco Corporation. Pressurize tank with nitrogen at 4 psig, agitate with simple impeller to create moderate vortex, and heat to 150° F.

Dispensing: Stop agitation or resin mixture, and pressurize with nitrogen to 50 psig. In a separate tank, pressurize Ethacure® 300, diamine curative from Albemarle Corporation, with nitrogen to 50 psig. Dispense and thoroughly mix resin mixture and curative simultaneously in a ratio of 100.5 parts to 21.5 parts by weight. Adjust backpressure in mixhead to avoid cavitation and to allow smooth dispensing and expansion of the foam. The resultant microcellular foam has approximately 0.92 specific gravity.

Example 5

Batch Preparation: Add 25,139 g of Adiprene® LF 750D from Uniroyal Chemical Company, urethane prepolymer, to a process tank equipped with heating and variable speed agitation. Add 1,295 g of UAX-6123, a nucleating surfactant form Witco Corporation. Pressurize tank with nitrogen at 50 psig, agitate with simple impeller to create moderate vortex, and heat to 150° F.

Dispensing: Stop agitation or resin mixture, and dispense foam only at 50 psig. The resultant uncured microcellular foam is very stable, with no coalescence or separation. The uncured foam has approximately 0.41 specific gravity.

While the preferred embodiments of the invention shown and described above have proven useful in producing a stable dense froth used to manufacture pads and belts with controlled, reproducible microcellular structure, further modifications of the present invention herein disclosed will occur to persons skilled in the art to which the invention pertains, and all such modifications are deemed to be within the scope and spirit of the present invention defined by the applicable claims.

What is claimed is:

1. A method of producing a stable resin froth used to produce a microcellural pad or belt comprising the steps of placing a thermosetable liquid polymer or prepolymer resin and nucleation surfactant in at least one tank, metering a frothing agent into said tank by way of at least one tube or sparge, drawing off said frothing agent via a pressure regulator from the headspace of said tank so as to reach a steady state of continuous flow of the frothing agent from said tube or sparge to said headspace of said tank, and agitating said thermosetable liquid polymer or prepolymer resin, nucleation surfactant and frothing agent through the use of an impeller at a controlled temperature and under a vacuum pressure sufficient to produce a froth having a specific gravity of from about 0.7 to 1.0 g/cc, said tube or sparge being located below the impeller.

2. The method of claim 1, wherein said prepolymer resin is a polyurethane.

3. The method of claim 1, wherein the nucleation surfactant is a block copolymer containing at lease one block comprising polydimethylsiloxane, and at least one other block comprising polyether, polyester, polyamide, or polycarbonate segments.

4. The method of claim 1, wherein the nucleation surfactant is a block copolymer containing at least one block comprising siloxane polyalkyleneoxide, and at least one other block comprising polyether, polyester, polyamide, or polycarbonate segments.

5. The method of claim 1, wherein the frothing agent is dry nitrogen or dry air.

6. The method of claim 1, wherein said thermosetable liquid polymer or prepolymer resin and nucleation surfactant are agitated using a radial flow, disc-shaped impeller comprising at least 2 vertical flat blades fixedly attached to the perimeter of said impeller.

7. The method of claim 1, wherein said thermosetable liquid polymer or prepolymer resin and nucleation surfactant form a vortex upon striking said impeller.

8. The method of claim 7, wherein said vortex shears large air bubbles formed by said agitation into smaller sized air bubbles.

9. The method of claim 1, wherein said vacuum has a range of 4" Hg to 16" Hg.

10. The method of claim 1, wherein said frothing agent is metered in at a rate of 1-10 scfh.

11. The method of claim 1, wherein said continuous flow of the frothing agent removes volatile and other gas impurities contained within the froth.

12. The method of claim 1, wherein said impeller is capable of rotating at various speeds.

13. The method of claim 12, wherein said impeller has a 6" blade.

14. The method of claim 13, wherein said impeller rotates at a speed ranging from 400 rpms to 1100 rpms.

15. The method of claim 1, wherein said impeller is coupled to a shaft, said shaft controlled by a power package which controls the speed at which the shaft and impeller rotate.

16. The method of claim 1, wherein the specific gravity of said froth will be in the range of 0.8-0.95 g/cc.

17. The method of claim 1, wherein the froth is produced in less than 4 hours.

* * * * *